United States Patent [19]

Harris

[11] Patent Number: 4,689,353

[45] Date of Patent: Aug. 25, 1987

[54] HYDROXY AND AMINO-FUNCTIONAL POLYAHLS CONTAINING CARBONATE, URETHANE AND/OR UREA MOIETIES

[75] Inventor: Robert F. Harris, Midland, Mich.

[73] Assignee: The Dow Chemical Company, Midland, Mich.

[21] Appl. No.: 831,761

[22] Filed: Feb. 21, 1986

[51] Int. Cl.[4] ............................................. C08G 18/14
[52] U.S. Cl. ..................................... 521/159; 521/164; 528/60; 528/64; 528/65; 528/66; 528/85; 560/158; 564/59; 564/60
[58] Field of Search ................... 521/159, 164; 528/60, 528/64, 65, 66, 85; 560/158; 564/59, 60

[56] References Cited

U.S. PATENT DOCUMENTS

| 3,248,414 | 4/1966 | Stevens | 260/463 |
|---|---|---|---|
| 3,248,415 | 4/1966 | Stevens | 260/463 |
| 3,248,416 | 4/1966 | Stevens | 260/463 |
| 3,284,479 | 11/1966 | Windemuth et al. | 260/453 |
| 3,313,782 | 4/1967 | Springmann et al. | 260/77.5 |
| 3,394,164 | 7/1968 | McClellan et al. | 260/453 |
| 3,492,330 | 1/1970 | Trecker et al. | 260/453 |
| 3,567,763 | 3/1971 | Emmons et al. | 260/478 |
| 3,689,462 | 9/1972 | Maximovich | 260/77.5 |
| 3,896,090 | 7/1975 | Maximovich | 260/77.5 |
| 4,002,598 | 1/1977 | Waddill et al. | 260/47 |
| 4,089,385 | 5/1978 | Payoux | 180/64 |
| 4,093,569 | 6/1978 | Reischl et al. | 260/2.5 |
| 4,108,842 | 8/1978 | König et al. | 528/61 |
| 4,115,360 | 9/1978 | Schulze et al. | 528/94 |
| 4,116,938 | 9/1978 | Schulze et al. | 528/93 |
| 4,125,522 | 11/1978 | Becker | 528/61 |
| 4,178,427 | 12/1979 | Waddill et al. | 528/124 |
| 4,191,705 | 3/1980 | Lindner et al. | 260/463 |
| 4,202,957 | 5/1980 | Bonk et al. | 528/77 |
| 4,218,543 | 8/1980 | Weber et al. | 521/51 |
| 4,221,876 | 9/1980 | Wagner | 521/158 |
| 4,297,444 | 10/1981 | Gilbert et al. | 521/160 |
| 4,310,448 | 1/1982 | Reischl | 260/29.6 |
| 4,359,550 | 11/1982 | Narayan et al. | 524/871 |
| 4,394,491 | 7/1983 | Hoffman | 525/452 |
| 4,460,715 | 7/1984 | Hoffman et al. | 521/137 |
| 4,465,713 | 8/1984 | Lock et al. | 427/385.5 |
| 4,476,293 | 10/1984 | Robinson | 528/76 |
| 4,495,309 | 1/1985 | Sutton et al. | 521/51 |

*Primary Examiner*—Maurice J. Welsh
*Attorney, Agent, or Firm*—Spencer & Frank

[57] ABSTRACT

Polyahls comprising
(1) a backbone having a random arrangement of
  (a) a plurality of alkylene urethane and/or
  (b) alkylene urea moieties and, optionally,
  (c) a plurality of alkylene carbonate and/or alkyleneoxy moieties, and/or alkylene moieties of greater than 6 carbons, and
(2) a plurality of active hydrogen moieties covalently bonded to the backbone or a side chain of the backbone provided that at least one of said active hydrogen moieties is hydroxyl and at least one of said active hydrogen moieties is amino are described.

Isocyanate-functional prepolymers are formed by the reaction of these polyahls with polyisocyanates. Polyurethane or polyurea compositions can be formed by the reaction of these isocyanate-functional prepolymers with a polyol or polyamine.

30 Claims, No Drawings

HYDROXY AND AMINO-FUNCTIONAL POLYAHLS CONTAINING CARBONATE, URETHANE AND/OR UREA MOIETIES

CROSS-REFERENCE TO RELATED APPLICATIONS

This application is related to copending Dow patent applications U.S. Ser. No. 750,362, filed Jul. 1, 1985; U.S. Ser. No. 799,211, filed Nov. 18, 1985; and U.S. Ser. No. 809,675, filed Dec. 16, 1985, each of which is hereby incorporated by reference.

BACKGROUND OF THE INVENTION

The invention relates to novel hydroxy and amino-functional polyahls containing carbonate, urethane, and/or urea moieties.

Stevens (in U.S. Pat. Nos. 3,248,414; 3,248,415; and 3,248,416) discloses the preparation of poly(alkylene carbonate) polyols from (1) carbon dioxide and 1,2-epoxides; (2) cyclic carbonates such as ethylene carbonate; or (3) cyclic carbonates and a 1,2-epoxide. A minor amount of a polyol is employed as an initiator.

U.S. Pat. No. 3,248,415 to Stevens discloses that certain polyamines can be used as initiators in reactions with alkylene carbonates or alkylene oxides and carbon dioxide. These polyamines, described at column 6, lines 33–57, include: other organic compounds having at least 2 active hydrogens usually from 2 to 4 active hydrogens are of use. By active hydrogen is meant a hydrogen linked directly to a nitrogen, sulfur or oxygen atom such as is found in hydroxyl, non-tertiary amino, mercapto, carbamate and carboxyl groups. Each active hydrogen as herein intended is linked to a different nitrogen, sulfur or oxygen atom in the compound.

Polyamines, especially diamines in which the amino groups are primary or secondary including ethylene diamine, trimethylene diamine, tetramethylene diamine, pentamethylene diamine, hexamethylene diamine and the like are suitable organics containing 2 active hydrogens. Piperazine and like polyamines wherein each of the nitrogens have but one hydrogen linked thereto (secondary amino nitrogens) are preferred. Alkylol amines such as ethanolamine and diethanolamine are illustrative of organics having 2 or more active hydrogens contributed by hydrogens linked to different atoms, e.g. nitrogen and oxygen.

Very similar language is used by Stevens in U.S. Pat. No. 3,248,416, at column 3, lines 38–61.

Maximovich (U.S. Pat. No. 3,896,090) reacted ethylene carbonate with diethylene glycol and treated the reaction product under reduced pressure to remove the unreacted ethylene carbonate and diethylene glycol.

Maximovich discloses at column 2, lines 60–66 and at column 3, lines 21–28, the use of organic compounds used in conjunction with the epoxide or alkylene carbonate. Maximovich discloses organic compounds having 2 or more active hydrogens, e.g., a monomeric polyol, such as is found in hydroxy, nontertiary amino, mercapto, and carboxyl groups, as well as polyamines, mercaptans, alkylolamines, and the like.

A variety of different workers have reported materials where only one of the moieties selected from the group of carbonate, urethane and urea is present in the backbone of the molecule. Representative carbonate examples are given in copending Dow application Ser. No. 750,362, filed July 1, 1985. Procedures have been developed by Yamazaki and Nakahama, Polymer Preprints (ACS, Div. Polym. Chem,) 20 (1) 146 (1979) which produce materials with carbonate, urethane or urea moieties in the backbone, However, their procedures neither yield materials with two or more different moieties selected from this group nor anticipate the use of alkyleneoxy units in the polymer backbone. Representative urea examples can be found in U.S. Pat. Nos. 4,002,598; 4,115,360; 4,116,938; 4,178,427 and West German 2,748,705. These materials have only amino end groups.

C. Giori, Polymer Preprints (ACS, Div. Polym. Chem.) 11 (1) 326 (1970) has studied the reactions of aminophenols and amino alcohols with phosgene in pyridine as solvent. Even though the bulk of his work involved aromatic systems, he did a limited amount of work with aliphatic systems. He studied ethanolamine, without success (no polymer), obtaining only the cyclic product, 2-oxzolinone. The only other aliphatic system which he studied was 1,6-aminohexanol. This system successfully produced polymer which contained both carbonate and urea moieties in the backbone. However, Giori states on p. 327 "According to these reactions, free amine groups, if present, will disappear from the system." This is stated to occur at ambient temperature. Therefore, this material produced by Giori does not meet the third criteria of the present invention since it does not have, on the average, end groups containing both hydroxyl and amino functionally. In addition, Giori's procedure yields alternate poly(carbonate-urea) structures not the random structures of the instant invention. Also, Giori did not disclose the use of alkyleneoxy units in the polymer backbone.

SUMMARY OF THE INVENTION

In one aspect, the present invention includes polyahls, the average structure of which comprises (1) a backbone having a random arrangement of
  (a) a plurality of alkylene urethane and/or
  (b) alkylene urea moieties and, optionally,
  (c) a plurality of
    (i) alkylene carbonate moieties and/or
    (ii) alkyleneoxy moieties and/or
    (iii) alkylene moieties of greater than six carbon atoms, and
(2) a plurality of active hydrogen moieties covalently bonded to the backbone or a side chain of the backbone provided that at least one of said active hydrogen moieties is hydroxyl and at least one of said active hydrogen moieties is amino.

These random polymers preferably contain alkyleneoxy units.

In another aspect, the present invention includes isocyanate-functional prepolymers formed by the polyahls described above with excess poly- isocyanates.

In a third aspect, the present invention includes urethane, urea and/or carbonate polymers (hereinafter called urethane/urea polymers) formed by either:

(1) reactions of isocyanate-functional prepolymers, as described above, with chain extenders such as polyfunctional hydroxyl or amino compounds, or (2) the reactions of the random polymers polyahls described above with polyisocyanates, optionally in the presence of other polyahls.

These urethane/urea polymers are useful in a variety of applications such as elastomers, plastics, rigid foams, flexible foams, structural polymers, coatings and adhesives.

DETAILED DESCRIPTION OF THE INVENTION

The starting materials to prepare the polyahls of this invention may be poly(alkylene carbonate) polyols, as described in copending applications U.S. Ser. Nos. 750,362; 799,211 and 809,675. Such compounds are randomized polymers containing $CO_2$ moieties and di- and polyalkyleneoxy units. The poly(alkylene carbonate) polyols can further contain the residue of an initiator as well as unreacted starting materials and other relatively volatile reaction products. Alkyleneoxy moieties refer herein to a series of repeating units which contain an alkylene group bound to an oxygen, wherein the carbons of the alkylene group can be further substituted with a hydrocarbyl moiety.

Alkylene carbonate and alkyleneoxy moieties are respectively represented by the following formulae:

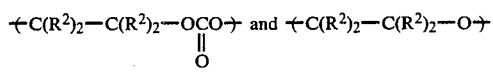

wherein $R^2$ is as hereinafter defined.

Preferred poly(alkylene carbonate) polyahls are random polyols represented by the formula:

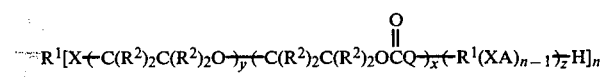

wherein $R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH, $$-\overset{O}{\underset{\|}{C}}O-,\ -O\overset{O}{\underset{\|}{C}}O-,\ \text{or}\ -O\overset{O}{\underset{\|}{C}}NH-;$$

A is separately in each occurrence

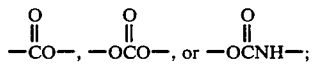

combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate) polyahls are poly(alkylene carbonate) polyols generally corresponding to the aforementioned formula wherein $R^1$, $R^2$, and n are as previously defined; X is oxygen; x is separately in each occurrence an integer of from 2 to 10; y is separately in each occurrence an integer of from 5 to 15 and z is an integer of from 0 to 2; provided that the ratio of y to x is from 1:1 to 3:1.

In the hereinbefore-defined formulas, $R^1$ is preferably an aliphatic or cycloaliphatic hydrocarbon containing one or more oxygen, nitrogen or sulfur moieties; $R^1$ is more preferably an n valent alkane or cycloalkene, or an n valent alkane or cycloalkane containing one or more oxygen, nitrogen or sulfur moieties; $R^1$ is even more preferably an n valent $C_{1-10}$ alkane or an n valent $C_{1-10}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl, or phenyl; $R^2$ is even more preferably hydrogen, methyl or ethyl; $R^2$ is even more preferably hydrogen or methyl, and, most preferably, hydrogen. X is preferably S, O or NH; X is most preferably O. Preferably, n is an integer of 1 to 10, inclusive; more preferably, 1 to 5, inclusive; and, most preferably, 1 or 2.

As used herein, the term "polyahl" includes any polyfunctional compound having on average more than 1 active hydrogen moiety is defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17.

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate) polyols and methods for preparation of these polyols are contained in Maximovich (U.S. Pat. No. 3,896,090), Maximovich (U.S. Pat. No. 3,689,462), Springmann (U.S. Pat. No. 3,313,782), Stevens (U.S. Pat. No. 3,248,416), Stevens (U.S. Pat. No. 3,248,415), and Stevens (U.S. Pat. No. 3,248,414) and copending application Serial No. 750,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. No. 4,476,293 and U.S. Patent 4,191,705, incorporated herein by reference.

The poly(alkylene carbonate) polyahls used as starting materials may also contain the residue of an initiator as well as unreacted starting materials and other relatively volatile reaction products.

Several processes are useful for making the compositions of this invention depending on which composition is desired, the backbone composition, molecular weight and other parameters.

A. By the process disclosed in Dow copending application Ser. No. 799,211 filed Nov. 18, 1985 reference. A polyamine, preferably an aminated poly(alkylene glycol), is used as modifier.

In this process a low molecular weight poly(alkylene carbonate) polyol is heated with a polyamine under reduced pressure. Dialkylene glycol (and smaller quantities of higher alkylene glycols) are removed.

The volatile components can be removed by any method known in the art. Such methods include fractional distillation, fractionation, passing an inert gas over the reaction mass so as to remove the volatile species, and any other method for removing the volatile species condensed by a water-chilled condenser as is known in the art—for example, a falling film still such as a wiped film evaporator is particularly useful. A preferred method of condensing the distillate is by the use of a water-chilled condenser. The majority of the volatile components present, such as acetone and water (both introduced during catalyst removal) and dioxane (small quantities of which can be present due to decomposition) pass through the water-chilled condenser under the reduced pressure conditions employed, and can be condensed using a dry ice condenser. The volatile species condensed by the water-chilled condenser can be recycled to be used as initiators for the preparation of poly(alkylene carbonate) polyols useful as starting materials.

This process to prepare the polyahls of this invention takes place at any temperature at which the splitting off of the volatile segments occurs. The lower temperature limit is that temperature at which the splitting of the volatile component occurs, and the upper limit is that temperature at which the poly(alkylene carbonate) polyol undergoes decomposition. Preferred temperatures are between about 150° C. and 300° C. More preferred temperatures are between about 175° C. and 260° C., with between about 200° C. and 250° C. being most preferred.

Pressures used to prepare polyahls of this invention are those pressures at which the dialkylene glycol or species as volatile as or more volatile than dialkylene glycol will volatilize at the temperatures used. Preferably, pressures are atmospheric and subatmospheric, with subatmospheric pressures being more preferable. More preferable pressures are less than about 300 mm Hg; even more preferably, less than about 100 mm Hg; even more preferably, less than about 50 mm Hg; and, most preferably, between 10 and 30 mm Hg.

The reaction time for the process to prepare the polyahls of this invention is variable depending on various factors, including temperature, pressure, and the molecular weight of the desired product. At lower pressures, and higher temperatures, the time to achieve the desired molecular weight is lower. The process can be run for a time sufficient to give the desired molecular weight. Reaction times are relatively rapid: only a few hours are required in most cases.

The process to prepare the polyahls of this invention is generally performed by exposing the poly(alkylenecarbonate) polyol in neat form to the processing conditions. The process can be performed in a solvent, although performing the process in neat form is preferred. Solvents useful include inert organic solvents with a boiling point above that of the dialkylene glycol, or the most volatile species.

The reaction products produced using this process can contain in the backbone:

(a) carbonate and urethane; or
(b) carbonate, urethane, and urea; or
(c) urethane and urea; or
(d) all urea Both hydroxyl and amino end groups are present in all cases studied.

Compositions of the present invention prepared by the process A are illustrated hereinafter in Examples 1–8.

B. By using an aminated poly(alkylene glycol) as initiator.

A poly(alkylene carbonate) polyahl is prepared by reaction of an initiator with alkylene carbonates or alkylene oxides and carbon dioxide. The initiator is a polyamine, preferably an aminated poly(alkylene glycol). Only a limited range of compositions are possible by this process since as the polyamine initiator content is increased the molecular weight is decreased.

Compositions of the present invention prepared by process B are illustrated hereinafter in Examples 10–14.

C. By the process of Dow copending application U.S. Ser. No. 750,362, using an aminated poly(alkylene glycol) as initiator.

Many additional compositions of this invention can be produced by subjecting the polyahl products prepared in process B to the reaction conditions used in Dow copending application U.S. Ser. No. 750,362. Under these conditions the product from process B is advanced to higher molecular weights by heating under reduced pressure with removal of dialkylene glycols (and lesser quantities of higher alkylene glycols).

Compositions of the present invention prepared by process C are illustrated hereinafter in Examples 15 and 16.

D. By the process of Dow copending application Ser. No. 809,675 filed Dec. 16, 1985 by transesterification.

A high molecular weight poly(alkylene carbonate) polyahl is produced by any known method or by the processes of copending Dow applications U.S. Ser. No. 799,211 or U.S. Ser. No. 750,362. This poly(alkylene carbonate) polyahl is then transesterified by heating with a polyamine, preferably an aminated poly(alkylene glycol), optionally in the presence of a catalyst. The molecular weight of the product is intermediate between the molecular weight of the starting materials and is controlled by the stoichiometry of the reactants.

A composition of the present invention prepared by process D is illustrated hereinafter in Example 9.

In another aspect, the present invention includes isocyanate-functional prepolymers formed by reacting the polyahls described above with excess polyisocyanates. The isocyanate-functional prepolymers can then be reacted further, for example, with chain extenders such as polyfunctional hydroxyl or amino compounds to produce the urethane/urea polymers of this invention. Alternatively, the polyahls of this invention can be reacted directly with polyisocyanates, optionally in the presence of chain extenders and additives, to produce the urethane/urea polymers of this invention. These polymers are useful in a variety of applications such as elastomers, plastics, rigid foams, flexible foams, structural polymers, coatings and adhesives.

The polyisocyanates suitable for these reactions include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane1,3-diisocyanate, cyclohexane-1,3- and 1,4-diisocyanate and mixtures of these isomers; 1-isocyanato-3,3,5-trimethyl-5- isocyanato methyl cyclohexane, (see e.g. German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/ hthylene-1,5-diisocyanate, or 4,4'-diisocyanate, nap triphenyl methane-4,4', 4"-triisocyanate, polyphenyl polymethylene polyisocyanates of the type obtained by condensing aniline with formaldehyde, followed by phosgenation and such as described for example in British Patent Nos. 874,430 and 848,671, perchlorinated aryl polyisocyanates of the type described in German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described, for example, in British Pat. No. 994,890 in Belgian Pat. No. 761,626 and in published Dutch Pat. Application No. 7,102,524 polyisocyanates containing isocyanurate groups of the type described in German Pat. Nos. 1,022,789; 1,222,067 and 1,027,394 and in German Offenlegungsschrift No. 1,929,034 and 2,004,048, polyisocyanates containing urethane groups of the type described, for example, in Belgian Pat. No. 752,261 or in U.S. Pat. No. 3,394,164, polyisocyanates containing acrylated urea groups as described in German Pat. No. 1,230,778, polyisocyanates containing biuret groups of the type described, for example, in German Pat. No. 1,101,392, in British Pat. No. 889,050 and in French Pat. No. 7,017,514, polyisocyanates obtained by telomerization reactions of the type described, for example, in Belgian Pat. No. 723,640, polyisocyanates containing ester groups of the type described, for example, in British Pat. No. 965,474 and 1,072,956, in U.S. Pat. No. 3,567,763 and in German Pat. No. 1,231,688 and reaction products of the aforementioned isocyanates with acetals as described in German Pat. No. 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Additional polyisocyanates suitable for use in this invention include those described by W. Siefken in Justus Liebigs Annalen der Chemie, 562, pages 75 to 136 and in U.S. Pat. No. 3,284,479; U.S. Pat. No. 4,089,835; U.S. Pat. Nos. 4,093,569; 4,221,876; U.S. 4,310,448; U.S. Pat No. 4,359,550 and U.S. Pat. No. 4,495,309.

One class of particularly useful polyisocyanates are the aromatic polyisocyanates such as 2,4- and 2,6-tolylene diisocyanate and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexane diol and ring containing diols such as bishydroxyethylhydroquinone, amide or ester containing diols or amino alcohols. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine, 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309; and U.S. Pat. No. 4,218,543.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N'N'-tetramethyl-1,3-butanediamine.

Optional additives include anti-foaming agents such as glycerine, an ethyl acrylate-2-ethylhexyl acrylate copolymer, dimethyl siloxane copolymers and silicones: antioxidants such as esters of β-(3,5-di- tert-butyl-4-hydroxyphenyl) propionic acid with monohydric or polyhydric alcohols, for example, methanol, octadecanol, 1,6-hexanediol, neopentylglycol, thiodiethylene glycol, diethylene glycol, triethylene glycol, pentaerythritol, tris-hydroxyethyl isocyanurate, and dihydroxyethyl oxalic acid diamide: UV absorbers and light stabilizers such as 2-(2'-hydroxyphenyl)benzotriazoles and sterically hindered amines as bis-(2,2,6, 6-tetramethylpiperidyl)-sebacate, bis-(1,2,2,6,6-pentamethylpiperidyl)-sebacate, n-butyl-3,5-di-tertbutyl-4-hydroxybenzyl malonic acid bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris (2,2,6,6- tetramethylpiperidyl)-nitrilotriacetate, tetrakis-(2,2,6,6-tetramethyl-4-piperidyl)-1,2,3,4-butane-tetracarbonic acid and 1,1'(1,2-ethanediyl)-bis-(3,3,5,5-tetramethylpiperazinone): plasticizers such as phthalates, adipates, glutarates, epoxidized vegetable oils, and the like: fungicides; pigments; dyes; reactive dyes; moisture scavengers; and the like. In addition, fillers and reinforcing materials such as chopped or milled glass fibers, chopped or milled carbon fibers and/or other mineral fibers are useful.

The urethane/urea polymers of the present invention are prepared by reacting approximately stoichiometric amounts of a polyisocyanate with one or more polyahls including a polyahl of this invention using reaction conditions conventionally employed, e.g., as shown in U.S. Pat. No. 4,460,715 and U.S. Pat. No. 4,394,491. The polyisocyanate can be an isocyanate-functional prepolymer of this invention which is prepared by reacting an excess of a polyisocyanate compound with a polyahl of this invention. The preparation of isocyanate-functional prepolymers is well known in the art. Examples can be found in U.S. Pat. Nos. 4,108,842; 4,125,522 and U.S. Pat. No. 4,476,292.

The urethane/urea polymers of the present invention can be fabricated by any fabrication technique known in the art. Useful processes include hand casting (see, for example, U.S. Pat. No. 4,476,292) and reaction injection molding (see, for example, U.S. Pat. No. 4,297,444 and U.S. 4,495,309).

SPECIFIC EMBODIMENTS

The following examples are included for illustrative purposes only, and do not limit the scope of the invention or the claims. Unless otherwise stated, all parts and percentages are by weight.

The molecular weights and distribution are determined by size exclusion chromatography on Waters Ultrastyragel ® 1000 Å and 10,000 Å columns in series using tetrahydrofuran (THF) as the mobile phase and calibrated with narrow molecular weight poly(ethylene glycol) standards. The data is reported as peak molecular weight (Peak), number average molecular weight ($\overline{M}n$), weight average molecular weight ($\overline{M}w$) and polydispersity index (PDI).

EXAMPLE 1

Reaction of a Poly(Ethylene Ether Carbonate) Polyol with Jeffamine D-400* (9.9 wt %)

A 100-ml, 2-necked boiling flask is equipped with a simple distillation head (Ace Glass #9358-03; no column) containing a water-cooled condenser. Thermometers are located to measure the pot temperature and the head temperature. The flask is charged with a poly(ethylene ether carbonate) polyol [77.5 g, 0.00545 mol $CO_2$/g, $\overline{M}_n=749$, $\overline{M}_w=1689$), Jeffamine D-400* (8.53 g) and boiling stones (0.2 g) and attached to a vacuum pump through a water-cooled condenser and a dry ice/isopropanol trap. The flask is slowly heated to 241° C. at 10 mm Hg vacuum while removing distillate. Samples are taken from the reactor and the distillate from the water-cooled condenser at various times. Analyses of these samples are given in Table 1. The residue (59.1 gms) is an amber liquid. The Brookfield viscosity (cps, 25° C.) is 48,000, and the basicity (meq amine/g) is 0.548.

* Jeffamine D-400 is aminated poly(propylene glycol) of 400 molecular weight. It is a product of the Jefferson Chemical Division of Texaco.

TABLE I

SUMMARY OF DATA FROM EXAMPLE 1: REACTION OF A POLY(ETHYLENE ETHER CARBONATE) POLYOL WITH 9.9 WT % D-400 AT 10 MM HG

| Sample Number | Pot Temp (°C.) | Head Temp (°C.) | Size Exclusion Chromatography of Pot Samples[1] | | | | Distillate Analysis[2] | | | | |
|---|---|---|---|---|---|---|---|---|---|---|---|
| | | | Peak | $\overline{M}_n$ | $\overline{M}_w$ | PDI | Total Wt (gms) | MEG (%) | Dioxane (%) | EC (%) | DEG (%) | TriEG (%) |
| 1 | 104 | 25 | 1074 | 633 | 1217 | 1.92 | — | ND | ND | ND | ND | ND |
| 2 | 150 | 34 | 1074 | 677 | 1127 | 1.66 | — | ND | ND | ND | ND | ND |
| 3 | 166 | 122 | 949 | 650 | 1061 | 1.63 | 1.6 | 2.7 | — | 34.4 | 60.6 | 0.9 |
| 4 | 172 | 126 | 1030 | 704 | 1338 | 1.89 | ND | ND | ND | ND | ND | ND |
| 5 | 175 | 126 | 1074 | 721 | 1351 | 1.87 | 4.1 | 1.1 | — | 11.8 | 85.7 | 1.4 |
| 6 | 183 | 130 | 1230 | 815 | 1363 | 1.67 | ND | ND | ND | ND | ND | ND |
| 7 | 187 | 131 | 1438 | 842 | 1531 | 1.81 | 7.5 | 0.4 | — | 2.0 | 94.1 | 3.1 |
| 8 | 195 | 132 | 1700 | 971 | 1797 | 1.85 | ND | ND | ND | ND | ND | ND |
| 9 | 205 | 131 | 2075 | 1092 | 2181 | 1.99 | 11.1 | 0.5 | 0.6 | 0.5 | 94.3 | 3.2 |
| 10 | 217 | 130 | 2480 | 1234 | 2549 | 2.06 | ND | ND | ND | ND | ND | ND |
| 11 | 224 | 132 | 3058 | 1401 | 3096 | 2.20 | 12.8 | 0.4 | 2.6 | — | 90.1 | 3.6 |
| 12 | 232 | 130 | 3888 | 1607 | 3943 | 2.45 | ND | ND | ND | ND | ND | ND |
| 13 | 241 | 131 | 4269 | 1713 | 4348 | 2.53 | 15.0 | 0.5 | 8.0 | 0.7 | 79.5 | 3.3 |

[1]SEC used Water's Ultrastyragel 10³ Å and 10⁴ Å columns in series; THF as the mobile phase (1.5 ml/min); a Water's refractive index detector; calibrated with standard poly (ethylene glycols).
[2]Analyzed by capillary GC on a Hewlett-Packard 5840A until with a J & W Scientific Company DB-1 fused silica capillary column; flame ionization detection.
ND = Not Determined.

EXAMPLE 2

Reaction of a Poly(Ethylene Ether Carbonate) Polyol with Jeffamine D-400(32.6 wt %)

The same apparatus used in Example 1 is charged with the same poly(ethylene ether carbonate) polyol as in Example 1 (51.8 g), Jeffamine D-400 (25.0 g) and boiling stones (0.2 g). The flask is slowly heated to 241° C. at 10 mm Hg vacuum while removing distillate. The residue (51.2 g) is an amber liquid. The basicity (meq amine/g) is 1.954. The distillate (18.4 g) is a colorless liquid containing 1.3% ethylene carbonate (EC), 89.3% diethylene glycol (DEG), and 3.8% triethylene glycol (TriEG).

EXAMPLE 3

Reaction of Poly(Ethylene Ether Carbonate) Polyol with Jeffamine D-400 (50.0 wt %)

The same apparatus as used in Example 1 is charged with the same poly(ethylene ether carbonate) polyol as in Example 1 (43.3 g), Jeffamine D-400 (43.3 g) and boiling stones (0.2 g). The flask is slowly heated to 240° C. at 10 mm Hg vacuum while removing distillate. The residue (57.3 g) is an amber liquid. The Brookfield viscosity (cps, 25° C.) is 11,040, and the basicity (meq amine/g) is 3.036. The distillate (21.5 g) is a colorless liquid containing 0.9% EC, 84.1% DEG, 6.7% TriEG.

EXAMPLE 4

Reaction of a Poly(Ethylene Ether Carbonate) Polyol with Jeffamine D-400 (65.0 wt %)

The same apparatus used in Example 1 is charged with the same poly(ethylene ether carbonate) polyol as in Example 1 (31.2 g), Jeffamine D-400 (57.9 g, 65.0 wt %) and boiling stones (0.2 g). The flask is slowly heated to 257° C. at 10 mm Hg vacuum while removing distillate. Samples are removed from the reactor for molecular weight determination by SEC (see the following).

| Sample Number | Pot Temp (°C.) | Head Temp (°C.) | Molecular Weight Data by SEC | | | |
|---|---|---|---|---|---|---|
| | | | Peak | $\overline{M}_n$ | $\overline{M}_w$ | PDI |
| 1 | 192 | 139 | 901 | 637 | 1021 | 1.60 |
| 2 | 207 | 145 | 901 | 720 | 1260 | 1.74 |
| 3 | 221 | 151 | 1365 | 815 | 1943 | 2.38 |
| 4 | 235 | 155 | 1515 | 927 | 1978 | 1.91 |
| 5 | 240 | 157 | 1682 | 1014 | 1983 | 1.95 |
| 6 | 257 | 176 | 1868 | 1103 | 2131 | 1.93 |

The residue (59.1 g) is an amber liquid. The Brookfield viscosity (cps, 25° C.) is 4,420, and the basicity (meq amine/g) is 4.005. The distillate (23.1 g) is a colorless liquid containing 0.6% EC, 71.7% DEG, and 8.0% TriEG.

The products of Examples 1–4 are further characterized by the following data:

A. Weight Balance Summary

| | Example Number | | | |
|---|---|---|---|---|
| | 1 | 2 | 3 | 4 |
| | | Wt % | | |
| D-400 Charged | 9.9 | 32.6 | 50.3 | 65.0 |
| Residue | 68.7 | 66.7 | 66.2 | 66.3 |
| Distillate | 17.4 | 24.0 | 24.8 | 25.9 |
| Dry Ice Trap | 3.3 | 2.9 | 1.6 | 1.3 |
| Unaccounted For | 10.6* | 6.4 | 7.4 | 6.5 |

*Includes many samples.

B. Carbon-13 NMR Studies

Carbon-13 NMR run on selected samples using DCCl$_3$ (dueterated chloroform) a solvent. Examination of the carbonyl carbon region indicates the kinds of carbonyls present in the polymer backbone. The structural features are as follows:

$$\begin{array}{ccc} \text{O} & \text{O} & \text{O} \\ \| & \| & \| \\ -\text{OCO}- & -\text{OCNH}- & -\text{NHCNH}- \\ 154.9 \text{ ppm} & 155.8 \text{ ppm} & 157.7 \text{ ppm} \end{array}$$

| | $^{13}$C Carbonyl Chemical Shift (ppm) | | |
|---|---|---|---|
| Example No. | Carbonate | Urethane | Urea |
| 2 | 154.9 | 155.8 | None |
| 3 | 154.9 | 155.8 | 157.7 |
| 4 | None | None | 157.7 |

Therefore, the product of Example 2 contains both carbonate and urethane moieties in the polymer backbone. The product of Example 3 contains carbonate, urethane and urea moieties in the polymer backbone. Example 4 contains only urea moieties in the polymer backbone.

C. IR Studies

IR assignment in the carbonyl region are consistent with the carbon-13 NMR assignments.

D. Backbone Hydrolysis Studies

A portion of each sample is hydrolyzed in methanolic NaOH, neutralized with gaseous HCl and the resultant diols are analyzed by vapor phase chromatography. A known amount of 1,6-hexanediol is added to each sample prior to hydrolysis to function as an internal standard. The results are as follows:

| | Wt. % D-400 Charged | Diols After Hydrolysis (Wt. %) | | | |
|---|---|---|---|---|---|
| Example Number | | DEG | TriEG | TetraEG | Total Diols |
| Poly(Ethylene Ether Carbonate) Polyol | 0 | 59.99 | 25.02 | 5.90 | 90.9 |
| 1 | 9.9 | 45.96 | 22.20 | 5.69 | 74.0 |
| 2 | 32.6 | 15.38 | 11.69 | 2.77 | 29.8 |
| 3 | 50.0 | 4.30 | 6.25 | 1.47 | 12.0 |
| 4 | 65.0 | — | 0.33 | — | 0.3 |

Since only carbonate and urethane moieties can yield a hydroxy group on hydrolysis, these results are consistent with the carbon-13 NMR results. Increasingly larger quantities of diols are displaced from the polymer backbone with increasing D-400 contents.

E. Titration for Free Amine Groups

The amine end groups are determined by titration with 0.1 N HCl. Results are given as follows:

| Example Number | Wt. % D-400 Charged | Wt. % of Amine Charged Present as | |
|---|---|---|---|
| | | Free Amine | Urethane/Urea |
| 1 | 9.9 | 32.4 | 67.6 |
| 2 | 32.6 | 46.3 | 53.7 |
| 3 | 50.0 | 36.5 | 63.5 |
| 4 | 65.0 | 42.7 | 57.3 |

Although a considerable amount of the amine is converted to urethane and urea moieties, free amine end groups are also present.

EXAMPLE 5

Reaction of Poly(Ethylene Ether Carbonate) Polyol with 1,12-Diaminododecane (50.0 wt %)

The same apparatus used in Example 1 is charged with the same poly(ethylene ether carbonate) polyol as in Example 1 (34.6 g), 1,12-diaminododecane (34.6 g) and boiling stones (0.2 g). The flask is heated to 220° C. at 10 mm Hg vacuum while removing distillate. The residue (42.1 g) is a tan solid and represents 60.9 wt % of the reactants charged. The distillate (20.2 g) is a colorless liquid, represents 29.2 wt % of reactants charged and has the following assay: 0.5% EC, 75.3% DEG, 17.2% TriEG, and 5.0% diaminododecane. The product is too insoluble in THF for molecular weight determination. It could be melted and readily drawn into fibers.

EXAMPLE 6

A poly(ethylene ether carbonate) polyol (451.3g; prepared from a 10:1 molar ratio of ethylene carbonate:-diethylene glycol; $\overline{M}_n=622$), Jeffamine D-400 (452.0g) and boiling stones (0.2g) are combined in a 1000 ml, 3-necked boiling flask equipped with a thermometer, temperature controller and a down draft water-chilled condenser attached to a vacuum source through a dry ice-isopropanol trap (about $-78°$ C.). The contents of the flask are heated to a pot temperature of 245° C. over a period of 3 hours at 10 mm Hg vacuum. The distillate collected in the water-chilled condenser accounts for 30.0 wt% (271.0g) of the sample charged and has the following assay: 0.32% dioxane, 64.4% diethylene glycol, 10.9% triethylene glycol and 0.25% tetraethylene glycol. In addition this distillate contains 18.9% of the D-400 (the light end of the D-400 0 distribution). The distillate collected at $-78°$ C. accounted for 0.8 wt % (7.6g) of the sample charged and has the following assay: 6.63% acetone, 42.4% dioxane and 23.9% water. The residue is a yellow, viscous liquid representing 63.4 wt % (572.0g) of the sample charged, has a Brookfield viscosity of 7,550 cps at 24° C., has a basicity of 1.289 meq amine/gm and has the following molecular weight:
peak $=1956$; $\overline{M}_n=1115$; $\overline{M}_w=2410$; PDI$=2.6$ Carbon-13 NMR shows that the product contains carbonate (154.9 ppm), urethane (155.8 ppm) and urea (157.7 ppm) moieties in the backbone. It also indicates end groups of primary hydroxyl moieties ($-CH_2OH$; 61.5 ppm) and primary amino moieties ($-CH(CH_3)NH_2$; 46.6 ppm).

This example shows a scale up in which D-400 is incorporated to form a poly(alkylene ether carbonate) polyahl which contains carbonate, urethane and urea moieties in the backbone and hydroxyl and amino end groups.

EXAMPLE 7

A poly(ethylene ether carbonate) polyol (700.3 g; prepared from ethylene oxide and carbon dioxide using diethylene glycol as initiator; $\overline{M}_n=700$), Jeffamine D-400 (200.6 g) and boiling stones (0.2 g) are combined in the same equipment used in Example 6. The contents of the flask are heated to a pot temperature of 230° C. over a period of 2.5 hours at 10 mm Hg vacuum. The distillate collected in the water-chilled condenser accounts for 17.4 wt % (156.3 g) of the sample charged and has the following assay: 1.35% ethylene carbonate, 48.2% diethylene glycol, 27.2% triethylene glycol and 5.22% tetraethylene glycol. In addition, this distillate contains 17.0% of the D-400 (the light end of the D-400 distribution). The distillate collected at $-78°$ C. accounted for 0.2% (1.6 g) of the sample charged and has the following assay: 3.3% acetone, 40.8% dioxane and 32.8% water. The residue is a light yellow, viscous liquid representing 79.0 wt % (712.0 g) of the sample charged, has a Brookfield viscosity of 4490 cps at 25° C., has a basicity of 0.656 meq amine/gm and has the following molecular weight:
Peak $=2469$; $\overline{M}n=1291$; $\overline{M}w=2701$; PDI$=2.09$.

EXAMPLE 8

The poly(ethylene ether carbonate) polyol used in Example 7 (821.6 g), Jeffamine D-400 (100.8 g) and boiling stones (0.2 g) are combined in the same equipment used in Example 6. The contents of the flask are heated to a pot temperature of 230° C. over a period of 2.5 hours at 10 mm Hg vacuum. The distillate collected in the water-chilled condenser accounts for 16.3 wt % (150.1 g) of the sample charged and has the following assay: 0.54% dioxane, 2.48% ethylene carbonate, 53.6% diethylene glycol, 27.5% triethylene carbonate and 4.39% tetraethylene glycol. In addition, this distillate contains 14.6% of the D-400 (the light end of the D-400 distribution). The distillate collected at $-78°$ C. accounted for 0.3 wt % (3.0 g) of the sample charged. The residue is a light yellow, viscous liquid representing 81.0 wt % (747.2 g) of the sample charged, has a Brookfield viscosity of 12,740 cps at 25° C., has a basicity of 0.326 meq, amine/gm and has the following molecular weight:
Peak $=2756$; $\overline{M}n=1596$; $\overline{M}w=3584$; PDI$=2.24$.

EXAMPLE 9

A poly(ethylene ether carbonate) polyol (21.28 g; 0.133 mol carbonate), Jeffamine D-400 (13.34 g; 0.0667 mol $NH_2$) and sodium stannate trihydrate (1.0 wt %) are combined and heated to 175° C. in a 50 ml, 3-necked boiling flask equipped with a thermometer, stirrer and temperature controller and maintained under a nitrogen atmosphere. This mixture (two phases) gives a molar ratio of carbonate:amine of 2.0. Samples are analyzed by size exclusion chromatography (see the following).

| Sample Number | Conditions | Molecular Weight Data | | | |
|---|---|---|---|---|---|
| | | Peak | $\overline{M}_n$ | $\overline{M}_w$ | PDI |
| Starting Polyol | | 3086 | 1071 | 2549 | 2.38 |
| D-400 | | 307 | 257 | 613 | 2.38 |
| 1 | Heated to 175° C. | 3343 | 589 | 2376 | 4.03 |
| 2 | 30 Min at 175° C. | 368 | 521 | 1208 | 2.31 |
| 3 | 60 Min at 175° C. | 368 | 442 | 832 | 1.87 |
| 4 | 90 Min at 175° C. | 795 | 495 | 875 | 1.76 |

The reaction is complete within 90 minutes at 175° C. The product is a single phase, liquid material containing very little free D-400 and contains 12.8 wt % $CO_2$ by NMR analysis. This represents a 76% $CO_2$ retention after reaction under the conditions employed. Carbon-13 NMR shows that the product contains both carbonate (154.9 ppm) and urethane 155.8 ppm) moieties in the backbone and hydroxyl and amino end groups. This example shows that a composition of this invention is produced by process (D) above using transesterification.

EXAMPLE 10

Ethylene carbonate (418.5g), Jeffamine D-400 (415.5g) and sodium stannate trihydrate (4.17g, 0.5 wt. %) are combined in a 1000 ml, 3-necked flask equipped with a thermometer, stirrer, condenser, temperature controller and maintained under a nitrogen atmosphere. The contents of the flask are heated for 7 hours at 135° C., then cooled to ambient temperature and the catalyst is removed by the method of U.S. Pat. No. 4,528,364.

The product properties are listed in Table 2.

TABLE 2

| Example Number | EC (g) | D-400 (g) | EC:D-400 Molar Ratio | Reaction Conditions | Product (g) | wt % D-400 | wt % CO$_2$ | Molecular Weight Data | | | | Brookfield Viscosity 25° C.;cps |
|---|---|---|---|---|---|---|---|---|---|---|---|---|
| | | | | | | | | Peak | $\overline{M}_n$ | $\overline{M}_w$ | PDI | |
| 10 | 418.5 | 415.5 | 5 | 7 hrs at 135° C. | 655.6 | 63.3 | 7.0 | 352 | 527 | 983 | 1.86 | 1,900 |
| 11 | 553.8 | 251.4 | 10 | 19 hrs at 135° C. | 645.4 | 39.0 | 12.6 | 843 | 708 | 1497 | 2.11 | 2,220 |
| 12 | 648.8 | 174.8 | 20 | 22 hrs at 135° C. | 625.9 | 28.0 | 19.4 | 1046 | 778 | 1532 | 1.97 | 3,010 |
| 13 | 748.8 | 65.6 | 50 | 46 hrs at 135° C. | 621.5 | 10.9 | 24.9 | 2682 | 1243 | 2688 | 2.16 | 25,400 |
| 14 | 792.9 | 39.3 | 100 | 52 hrs at 135° C. | 609.8 | 6.4 | 27.5 | 3302 | 1422 | 3254 | 2.29 | 45,300 |

EXAMPLES 11-14

Different ratios of ethylene carbonate: Jeffamine D-400 are reacted as in Example 10. Catalysts are removed as in Example 10. Product properties are listed in Table 2.

A variety of useful compositions are made by this process. The amount of D-400 must be reduced to produce higher molecular weight materials. As the amount of D-400 is reduced the backbone composition is varied as follows:

| Example Number | EC:D-400 Molar Ratio | $^{13}$C—NMR of Carbonyl (ppm) | | | Basicity (meq/gm) |
|---|---|---|---|---|---|
| | | $\overset{O}{\underset{\|\|}{-NHCNH-}}$ | $\overset{O}{\underset{\|\|}{-NHCO-}}$ | $\overset{O}{\underset{\|\|}{-OCO-}}$ | |
| 10 | 5 | 157.7 | 155.8 | none detected | 0.475 |
| 11 | 10 | 157.7 | 155.8 | 154.9 | 0.120 |
| 12 | 20 | 157.7 | 155.8 | 154.9 | 0.241 |
| 13 | 50 | Trace | Trace | 154.9 | 0.0641 |
| 14 | 100 | none detected | none detected | 154.9 | 0.0301 |

Examples 10-14 show that compositions of this invention can be made by using process (B) above. Each product contains both hydroxyl and amino end groups.

EXAMPLE 15

The low molecular weight, D-400 modified product of Example 10 (88.5g) and boiling stones (0.2g) are combined in a 100 ml flask equiped with a thermometer, temperature controller and a simple take-off head with a water-chilled condenser attached to a vacuum source through a dry ice-isopropanol (about −78° C.) trap. The contents of the flask are heated to 220° C. over a period of 3 hours at 10 mm Hg vacuum. The distillate collected in the water-chilled condenser accounts for 19.3 wt % (17.1 g) of the sample charged and has the following assay: 1.5% ethylene carbonate, 84.5% diethylene glycol and 1.9% triethylene glycol. The distillate collected at −78° C. accounts for 0.4 wt % (0.4g) of the sample charged. The residue is a light amber, viscous liquid representing 79.6 wt % (70.4g) of the sample charged, contains 0.585 meq/gm of titratable base, has a Brookfield viscosity of 84,300 cps at 25° C. and has the following properties:

| Advanced | wt % Residue | Molecular Weight Data | | | | Basicity (meq/gm) |
|---|---|---|---|---|---|---|
| | | Peak | $\overline{M}_n$ | $\overline{M}_w$ | PDI | |
| no | — | 352 | 527 | 983 | 1.86 | 0.475 |
| yes | 79.6 | 2630 | 2531 | 6707 | 2.65 | 0.585 |

Carbon-13 NMR shows that the product contains both urea (158.0 ppm) and urethane (156.0 ppm) moieties but no carbonate moieties. It also shows both hydroxyl and amino end groups.

This example shows that the compositions of this invention can be made by using process (c) above to give materials which contain urea and urethane moieties in the backbone.

EXAMPLE 16

The low molecular weight, D-400 modified product of Example 11 (97.5g) and boiling stones (0.2g) are combined using the same reactor set up as in Example 15. The contents of the flask are heated to 225° C. over a period of 3 hours at 10 mm Hg vacuum. The distillate collected in the water-chilled condenser accounts for 17.5 wt % (17.1g) of the sample charged and has the following assay: 0.79% monoethylene glycol, 11.9% ethylene carbonate, 81.0% diethylene glycol and 1.2% triethylene glycol. The distillate collected at −78° C. accounts for 2.3 wt % (2.2g) of the sample charged and has the following assay: 74.3% acetone and 16.8% dioxane. The residue is a light amber, viscous liquid representing 79.7 wt % (77.8g) of the sample charged, contains 0.131 meq/g of titratable base, has a Brookfield viscosity of 83,100 cps at 25° C. and has the following properties:

| Advanced | wt % Residue | Molecular Weight Data | | | | Basicity (meq/gm) |
|---|---|---|---|---|---|---|
| | | Peak | $\overline{M}_n$ | $\overline{M}_w$ | PDI | |
| no | — | 843 | 708 | 1497 | 2.11 | 0.120 |
| yes | 79.7 | 3415 | 1837 | 4861 | 2.65 | 0.131 |

Carbon-13 NMR shows that the product contains urea (158.0 ppm), urethane (156.0 ppm) and carbonate (155.0 ppm) moieties. It also shows both hydroxyl and amino end groups.

This example shows that the compositions of this invention can be made by using process (C) above to give materials which contain urea, urethane and carbonate moieties in the backbone.

EXAMPLE 17

Preparation of an Ioscyanate-Functional Prepolymer

Freshly distilled 4,4'-methylenedi(phenyl isocyanate) (MDI; 56.2 g; Isonate ® 125M) is placed in a 100 ml resin pot equipped with thermometer, overhead stirrer, dropping funnel, temperature controlled at 80° C. and maintained under a nitrogen atmosphere. A portion of the poly(ethylene ether carbonate) polyahl prepared in Example 7 (58.9 g) and one drop (about 15 mg) of benzoyl chloride are thoroughly mixed and placed in the dropping funnel. The benzoyl chloride dissolves in the polyahl and functions as a stabilizer for the prepolymer. The polyahl is added dropwise over a 3.5 hour period at 80° C. The prepolymer is then analyzed for isocyanate content (ASTM D-2638-74) and found to be 12.53 wt % NCO.

EXAMPLE 18

Preparation of Urethane/Urea Elastomer

The isocyanate-functional prepolymer of Example 17 is thoroughly degassed under vacuum and quickly poured into a 150 ml plastic cup (82.72 g). One drop (about 15 mg) of a catalyst solution is added (10.0 wt % dibutyltin dilaurate) in a 2000 molecular weight poly(propylene glycol). 1,4-Butanediol (10.58 g, distilled from $CaH_2$) which had been thoroughly degassed under vacuum is added quickly to give a 1.05 index (molar ratio of isocyanate: active hydrogen is 1.05:1). The mixture is stirred rapidly for 32 seconds and then poured into a preheated mold (6.0"×6.0"×0.125"). The sample is cured at 121° C. (250° F.) for one hour. An elastomeric urethane/urea plaque is obtained upon demolding. The part is allowed to stand for 14 days at ambient conditions; then physical properties are determined (see Table 3).

TABLE 3
PHYSICAL PROPERTIES OF URETHANE/UREA ELASTOMERS

| Polymer From Example No. | Wt % NCO | Hardness (Shore D) | Flexural Modulus | Tensile Modulus | Tensile Strength at 100% Elongation (psig) | Notched Izod |
|---|---|---|---|---|---|---|
| 18 | 12.53 | 71 | 32,800 | 34,800 | 3660 | NB* |
| 20 | 12.89 | 66 | 35,700 | 31,800 | 2970 | NB* |

NB = No Break

EXAMPLE 19

Preparation of an Isocyanate-Functional Prepolymer

A prepolymer is made from MDI (55.40 g), the poly(ethylene ether carbonate) polyahl of Example 8 (59.6 g) and one drop of benzoyl chloride (about 15 mg) using the same equipment and procedure as in Example 17. The prepolymer has a 12.89 wt % NCO content.

EXAMPLE 20

Preparation of Urethane/Urea Elastomer

The isocyanate-functional prepolymer of Example 19 (104.58 g), one drop of catalyst and 1,4butanediol (13.876 g, 1.05 index) are combined using the same procedure as in Example 18. The physical properties are given in Table 3.

It is understood that various other modifications will be apparent to and can readily be made by those skilled in the art without departing from the scope and spirit of this invention. Accordingly, it is not intended that the scope of the claims appended hereto be limited to the description as set forth above, but rather that the claims be construed as encompassing all the features of patentable novelty which reside in the present invention, including all features which would be treated as equivalents thereof by those skilled in the art to which this invention pertains.

What is claimed is:

1. A polyahl with an average structure comprising
   (1) a backbone having a random arrangement of
      (a) a plurality of alkylene urethane and/or
      (b) alkylene urea moieties and, optionally,
      (c) a plurality of
         (i) alkylene carbonate moieties,
         (ii) alkyleneoxy moieties and/or
         (iii) alkylene moieties of greater than 6 carbons, and
   (2) a plurality of active hydrogen moieties covalently bonded to the backbone or a side chain of the backbone provided that at least one of said active hydrogen moieties is hydroxyl and at least one of said active hydrogen moieties is amino.

2. An isocyanate-functional prepolymer comprising the reaction product of:
   (1) the polyahl of claim 1, and
   (2) an organic polyisocyanate wherein all active hydrogen moieties of the polyahl have reacted to form a prepolymer having a plurality of reactive isocyanate moieties.

3. A polyurethane/urea which is the reaction product of:
   (1) the isocyanate-functional prepolymer of claim 2, and
   (2) a polyahl.

4. A polyurethane/urea which is the reaction product of:
   (1) the polyahl of claim 1,
   (2) an organic polyisocyanate, and (3) optionally one or more other polyahls.

5. The polyahl of claim 1, wherein said backbone comprises a random arrangement of
   (1) alkylene moieties of greater than six carbon atoms or alkyleneoxy moieties,
   (2) carbonate moieties, and
   (3) urethane moieties.

6. The polyahl of claim 1, wherein said backbone comprises a random arrangement of
   (1) alkylene moieties of greater than six carbon atoms or alkyleneoxy moieties, and
   (2) urea moieties.

7. The polyahl set forth in claim 1, wherein said backbone comprises a random arrangement of
   (1) alkylene moieties of greater than six carbon atoms or alkyleneoxy moieties,
   (2) urethane moieties, and
   (3) urea moieties.

8. The polyahl set forth in claim 1, wherein said backbone comprises a random arrangement of
   (1) alkylene moieties of greater than six carbon atoms or alkyleneoxy moieties,
   (2) carbonate moieties,
   (3) urethane moieties, and
   (4) urea moieties.

9. The isocyanate-functional prepolymer of claim 2, wherein said polyahl has a backbone comprising a random arrangement of alkyleneoxy moieties, carbonate moieties, and urethane moieties.

10. The isocyanate-functional prepolymer of claim 2, wherein said polyahl has a backbone comprising a random arrangement of alkyleneoxy moieties and urea moieties.

11. The isocyanate-functional prepolymer of claim 2, wherein said polyahl has a backbone comprising a random arrangement of alkyleneoxy moieties, urethane moieties, and urea moieties.

12. The isocyanate-functional prepolymer of claim 2, wherein said polyahl has a backbone comprising a random arrangement of alkyleneoxy moieties, carbonate moieties, urethane moieties, and urea moieties.

13. The polyurethane/urea of claim 3, wherein said isocyanate-functional prepolymer comprises the reaction product of:
(1) a polyahl having a backbone comprising a random arrangement of alkyleneoxy moieties, carbonate moieties, and urethane moieties, and
(2) an organic polyisocyanate wherein all active hydrogen moieties of said polyahl are reacted with the isocyanate moieties to form a prepolymer having a plurality of reactive isocyanate moieties.

14. The polyurethane/urea of claim 3, wherein said isocyanate-functional prepolymer comprises the reaction product of:
(1) a polyahl having a backbone comprising a random arrangement of alkyleneoxy moieties and urea moieties, and
(2) an organic polyisocyanate wherein all active hydrogen moieties of said polyahl are reacted with the isocyanate moieties to form a prepolymer having a plurality of reactive isocyanate moieties.

15. The polyurethane/urea of claim 3, wherein said isocyanate-functional prepolymer comprises the reaction product of:
(1) a polyahl having a backbone comprising a random arrangement of alkyleneoxy moieties, urethane moieties, and urea moieties, and
(2) an organic polyisocyanate wherein all active hydrogen moieties of said polyahl are reacted with the isocyanate moieties to form a prepolymer having a plurality of reactive isocyanate moieties.

16. The polyurethane/urea of claim 3, wherein said isocyanate-functional prepolymer comprises the reaction product of:
(1) a polyahl having a backbone comprising a random arrangement of alkeneoxy moieties, carbonate moieties, urethane moieties, and urea moieties, and
(2) an organic polyisocyanate wherein all active hydrogen moieties of said polyahl are reacted with the isocyanate moieties to form a prepolymer having a plurality of reactive isocyanate moieties.

17. The polyurethane/urea of claim 4, which is the reaction product of:
(1) a polyahl with an average structure having a backbone comprising a random arrangement of alkyleneoxy moieties, carbonate moieties, and urethane moieties,
(2) an organic polyisocyanate, and
(3) optionally one or more other polyahls.

18. The polyurethane/urea of claim 4, which is the reaction product of:
(1) a polyahl with an average structure having a backbone comprising a random arrangement of alkyleneoxy moieties and urea moieties,
(2) an organic polyisocyanate, and
(3) optionally one or more other polyahls.

19. The polyurethane/urea of claim 4, which is the reaction product of:
(1) a polyahl with an average structure having a backbone comprising a random arrangement of alkyleneoxy moieties, urethane moieties, and urea moieties,
(2) an organic polyisocyanate, and
(3) optionally one or more other polyahls.

20. The polyurethane/urea of claim 4, which is the reaction product of:
(1) a polyahl with an average structure having a backbone comprising a random arrangement of alkyleneoxy moieties, carbonate moieties, urethane moieties, and urea moieties,
(2) an organic polyisocyanate, and
(3) optionally one or more other polyahls.

21. The polyurethane/urea of claim 3 wherein said polyahl is a polyol.

22. The polyurethane/urea of claim 21 wherein said polyol is 1,4-butanediol, monoethylene glycol or dipropylene glycol.

23. The polyurethane/urea of claim 3 wherein said polyahl is a polyamine.

24. The polyurethane/urea of claim 23 wherein said polyamine is diethyltoluene diamine, ethylenediamine or 1,4-diaminobutane.

25. The polyurethane/urea of claim 4 wherein said other polyahl is a polyol or a polyamine.

26. The polyurethane/urea of claim 25 wherein said polyol or polyamine is 1,4-butanediol, monoethylene glycol or diethyltoluene diamine.

27. The isocyanate-functional prepolymer of claim 2 wherein the polyisocyanate is an aromatic polyisocyanate.

28. The isocyanate-functional prepolymer of claim 2 wherein the polyisocyanate is an aliphatic polyisocyanate.

29. The polyurethane/urea of claim 4 wherein the polyahl is a polyamine.

30. The polyurethane/urea of claim 4 wherein the polyisocyanate is an aliphatic polyisocyanate.

* * * * *